Figure 1:

W. S. LANDIS.
PROCESS OF AND APPARATUS FOR OXIDIZING AMMONIA.
APPLICATION FILED FEB. 20, 1915.

1,193,797.   Patented Aug. 8, 1916.

UNITED STATES PATENT OFFICE.

WALTER S. LANDIS, OF NIAGARA FALLS, NEW YORK, ASSIGNOR TO FRANK S. WASHBURN, OF NASHVILLE, TENNESSEE.

PROCESS OF AND APPARATUS FOR OXIDIZING AMMONIA.

1,193,797.   Specification of Letters Patent.   Patented Aug. 8, 1916.

Application filed February 20, 1915. Serial No. 9,596.

*To all whom it may concern:*

Be it known that I, WALTER S. LANDIS, a citizen of the United States, residing at Niagara Falls, in the county of Niagara and State of New York, have invented certain new and useful Improvements in Processes of and Apparatus for Oxidizing Ammonia; and I do hereby declare the following to be a full, clear, and exact description of the invention, such as will enable others skilled in the art to which it appertains to make and use the same.

This invention relates to a process of and apparatus for oxidizing ammonia and has for its object to produce nitrose gases in a manner more efficient and less costly than has been heretofore proposed.

With these and other objects in view the invention consists in the novel steps constituting my process and in the novel construction constituting my apparatus, all as will be more fully hereinafter disclosed and particularly pointed out in the claims.

In my copending application Serial No. 9595, filed Feb. 20, 1915, and entitled method of oxidizing ammonia, I disclosed certain reactions that are involved in the oxidation of ammonia to nitrose gases, and how the precooling of the gas mixture before striking the catalyzer gave rise to a much higher efficiency than is found in the older methods which did not employ this cooling action. But in the use of a cooler there is naturally brought forward prominently the necessity of providing special means for supplying the required amount of outside heat to the reacting mixture in order that the flame may burn continuously.

I have found that when one uses an ammonia-air mixture in the proportion of one volume of ammonia to 15 volumes of air the resulting flame temperature is only about 460° C. and inasmuch as this combustion takes place best at temperatures of slightly above 700° C. I find with such proportions of air there is a deficiency in heat units of 2670 cals. per cubic meter of ammonia burned. Even in case one operates with a mixture of one volume of ammonia to ten volumes of air the resulting flame temperature is only 640° C. and there is a deficiency of 470 cals. per cubic meter of ammonia burned. On the other hand similar calculations show that if a mixture to prevent its subsequent decomposition of one volume of ammonia to $7\frac{1}{2}$ volumes of air could be used the resulting flame temperature, allowing for slight losses, would be just about right for the proper working of the catalyzer. But again, when a mixture of ammonia and air containing less air than one volume of ammonia to ten volumes of air is used it does not operate well from a chemical standpoint; and, therefore, one always needs to supply, when operating with ammonia-air mixtures, a certain quantity of heat to the reaction, depending upon the ratio of ammonia to air. I, therefore, have found that one must be prepared, in operating a catalyzer for this purpose, to supply a variable amount of heat, the quantity depending upon the ratio of ammonia to air which one desires to use.

Of course, if one uses an enriched air, such as the waste gases from a liquid air plant, producing nitrogen, or if one employs purposely enriched gases made by introducing oxygen into air in any well known manner, this deficiency of heat will disappear with an increase in the oxygen content of the air used. It is however, necessary to meet a varying heat requirement in the reaction, even when operating with various kinds and proportions of enriched air.

It is under all circumstances necessary to supply heat in order to start the reaction going, and this can best be done by preheating the catalyzer until the flame ignites and burns steadily. We, therefore, see that in a commercial operation of an ammonia oxidation plant it is necessary to provide means, not only of heating the catalyzer, but of controlling the amount of heat one supplies to this apparatus.

I am well aware that the most advantageous system of supplying heat that must be accurately controlled, is through transforming electrical energy into heat by the interposition of a suitable resistance, and the ease with which this electrically generated heat can be controlled to an exactness which is so essential to this process makes it an added feature of the process.

I am also aware that many years ago laboratory experiments were carried out in which platinum spirals were heated in a current of an ammonia-air mixture, forming nitric acid. These experiments, however, were only of scientific interest because the yields were extremely low and a very large percentage of nitric acid which might have been formed was subsequently decomposed by remaining in contact with the electrically heated spirals. The objections to the above processes have been overcome by my process now to be disclosed. That is to say, I have discovered a principle by which high efficiencies of oxidation are attained on a commercial scale, adapted to produce hundreds of pounds of nitric acid daily. In the first place, I use a new form of catalyzer, coupled with the use of electrical energy for supplying the necessary heat to maintain the necessary reacting temperature in the apparatus. The previous forms of catalyzers used, so far as I am aware, have consisted of platinum tubes, various complex combinations of sheets and tubes, interlacings of platinum sheet, platinized mica, and even platinized asbestos as well as platinum sponge. None of these however, lend themselves readily to electrical heating because their construction does not afford a uniform resistance throughout the catalyzer, and therefore, there will be some local overheating should an electrical current be passed through them. It is very important in this process that the catalyzer be absolutely uniformly heated, as exact temperature control is an important part of the oxidation process. That is to say, if a catalyzer in the form of a wire for example should be hotter in one place than in another place, it is evident that not only would any free ammonia present be liable to decomposition at the hotter places, but the nitrose gases themselves might suffer decomposition at said hotter places while they fail of formation at the cooler places. It is also evident that even if the said wire is free from the objections just noted by being uniformly heated, it still may not be maintained at that temperature which will produce the highest efficiencies, so that a controlling means such as a rheostat is important in this invention. I, therefore, use for my catalyzer a uniform drawn platinum wire, wound upon a frame, leaving very narrow spaces between the individual wires, all as will be clear from the accompanying drawings forming a part of this specification, in which:—

Figure 2:
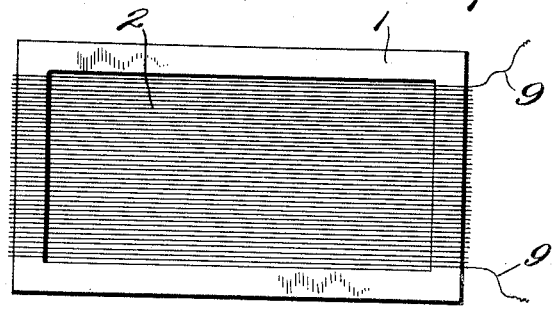
Figure 3:
Figure 4:
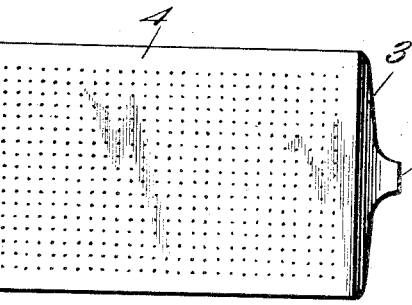
Figure 5:
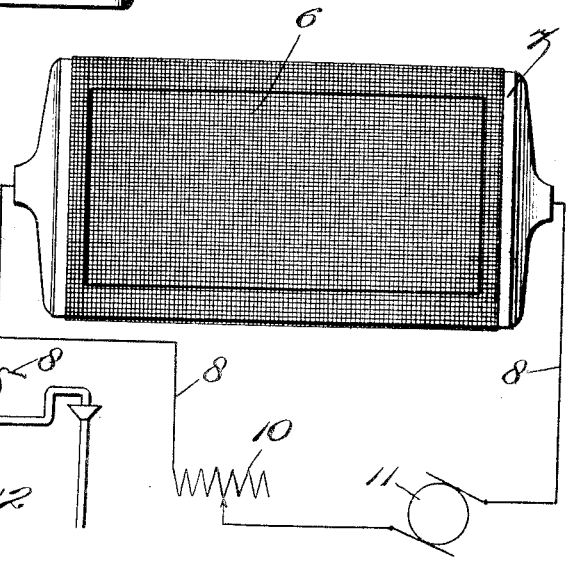
Figure 6:
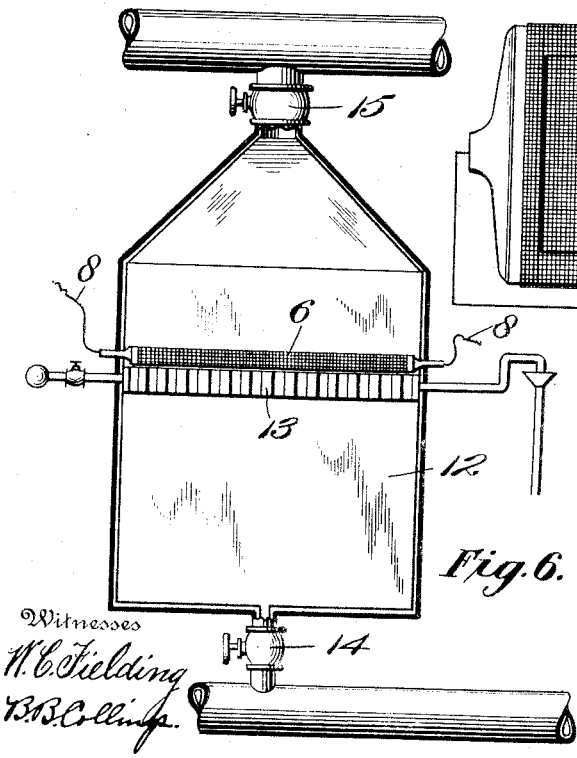

Figure 1 is a diagrammatic longitudinal sectional view of a catalyzing apparatus, made in accordance with my invention; Fig. 2 is a plan view of the parts shown in Fig. 1; Fig. 3 is a transverse sectional view of the parts shown in Fig. 2; Fig. 4 is a plan view of a modified form of apparatus; Fig. 5 is a plan view of a further modified form of catalyzing apparatus; and Fig. 6 illustrates an oxidation chamber containing a cooler associated with a catalyzing device.

In Figs. 1, 2 and 3, 1 represents any suitable form of insulating material, and 2 a fine platinum wire closely wound thereon.

In the modified form of catalyzer shown in Fig. 4, I provide any suitable frame 3, and attach thereto the finely perforated platinum sheet 4, to which is electrically connected the circuit 5.

In the further modified form of apparatus shown in Fig. 5, I employ the platinum mesh or wire cloth 6, mounted on the frame 7 to which is attached the circuit 8. In all the circuits 5, 8 and 9, I, of course, provide a suitable rheostat 10, and a source of suitable current 11.

By employing one or more catalyzers such as illustrated in an oxidation chamber 12, provided with a cooler 13, inlet 14 and outlet 15, all as disclosed in my said copending application above, I can heat the catalyzer material uniformly with an electric current, and by means of a suitable rheostat can maintain the temperature at any point desired.

I have found that a platinum gauze with wires of say .005 of an inch in diameter or less, and with meshes of say 60 to the inch serve very well, and that the diameter of the wire and number of meshes have little influence provided they are of dimensions less than those above stated.

By inserting such a catalyzer in my apparatus I can heat it electrically to the desired temperature, and pass a current of an ammonia-air mixture through it attaining practically 100% efficiency in oxidation.

By means of the electrical control, consisting of either a resistance or a variable voltage transformer I can vary the heat generated in this form of catalyzer to correspond to the varying proportions of ammonia to air in the mixture, whether using air alone, or oxygen enriched air. Or in case I have sufficient oxygen in my enriched air, I can simply use this electrical energy for starting the reaction, after which it will take care of itself. It is, of course, self-evident that I can insert this form of catalyzer inside of a mass of platinized asbestos, or platinized oxids of various sorts, or, in fact, many other non-conducting salts, such as plumbates, manganates, etc. which have been proposed for catalyzers for the oxidation of ammonia to nitrose gases. In such cases I may make my wire of other metals than platinum, and use it simply as a heating element, controlling the temperatures of the catalyzer and to supplying the heat deficiency of the reaction, in case such exists.

In case the ammonia-air mixture is not enriched by oxygen, it is found desirable to uniformly heat the catalyzer material above 500° C. and usually up to about 700° C. or higher, depending on the proportions of air and ammonia actually employed. It is, also, desirable to cool the mixture as much as possible before subjecting it to the action of the catalyzer, and to this end I may cool the mixture to any desired degree by passing it through suitable refrigerating coils under pressure before leading it to the oxidizing chamber, thereby facilitating the further cooling action of the apparatus 13 in said chamber. The best form of wire catalyzer I have found for this purpose, is iridium free platinum. In other words, I find if even a very small quantity of iridium is present in the platinum it greatly decreases the efficiency of the catalyzer.

It is evident that those skilled in the art may vary the details of my apparatus as well as of my process without departing from the spirit thereof, and therefore I do not wish to be limited to the above disclosure except as may be required by the claims.

What I claim is:

1. The process of oxidizing ammonia which consists in providing a suitable mixture of ammonia and air; and subjecting said mixture to the action of a catalyzer uniformly heated to a predetermined temperature substantially as described.

2. The process of oxidizing a mixture containing ammonia and oxygen in predetermined proportions, which consists in subjecting said mixture to the action of a catalyzer uniformly heated to a predetermined degree substantially throughout its mass, and maintaining said temperature at a predetermined point while the reaction proceeds, substantially as described.

3. The process of oxidizing a mixture containing ammonia and oxygen in predetermined proportions, which consists in subjecting said mixture to the action of a catalyzer uniformly heated to a predetermined degree throughout its mass, while preventing the heat radiated by said catalyzer from decomposing said ammonia before reaching said catalyzer; and maintaining said temperature at a predetermined point while the reaction proceeds, substantially as described.

4. The process of oxidizing a gaseous mixture containing ammonia and oxygen in predetermined proportions, which consists in subjecting said mixture to the action of a catalyzer uniformly heated to a predetermined degree throughout its mass; cooling said mixture before it reaches said catalyzer to prevent the heat radiated by said catalyzer from decomposing said ammonia; and maintaining said temperature at a predetermined point while the reaction proceeds, substantially as described.

5. The process of oxidizing ammonia which consists in providing a suitable mixture of ammonia and air; subjecting said mixture to the action of a catalyzer of a uniform temperature throughout its active surface; and suitably controlling said temperature, substantially as described.

6. The process of oxidizing a mixture containing free ammonia, oxygen and nitrogen in predetermined proportions which consists in subjecting said mixture to the action of a hot catalyzer; screening said ammonia from the heat radiated by said catalyzer before it reaches the latter; and maintaining said temperature at a predetermined point while the reaction proceeds, substantially as described.

7. In an apparatus for oxidizing ammonia, the combination of a uniformly heated catalyzer; a cooler associated with said catalyzer; and means to regulate the temperature of said catalyzer, substantially as described.

8. In an apparatus for oxidizing ammonia, the combination of a uniformly heated catalyzer comprising an electric conductor; an electric circuit in which said conductor is joined; a cooler associated with said catalyzer; and means to regulate the temperature of said catalyzer as comprising a rheostat in said circuit, substantially as described.

In testimony whereof I affix my signature, in presence of two witnesses.

WALTER S. LANDIS.

Witnesses:
GEORGE A. HENDICK,
S. WARREN MAYS.